R. R. HILL AND R. G. LAW.
PISTON PACKING.
APPLICATION FILED NOV. 22, 1919.
1,381,993.
Patented June 21, 1921.
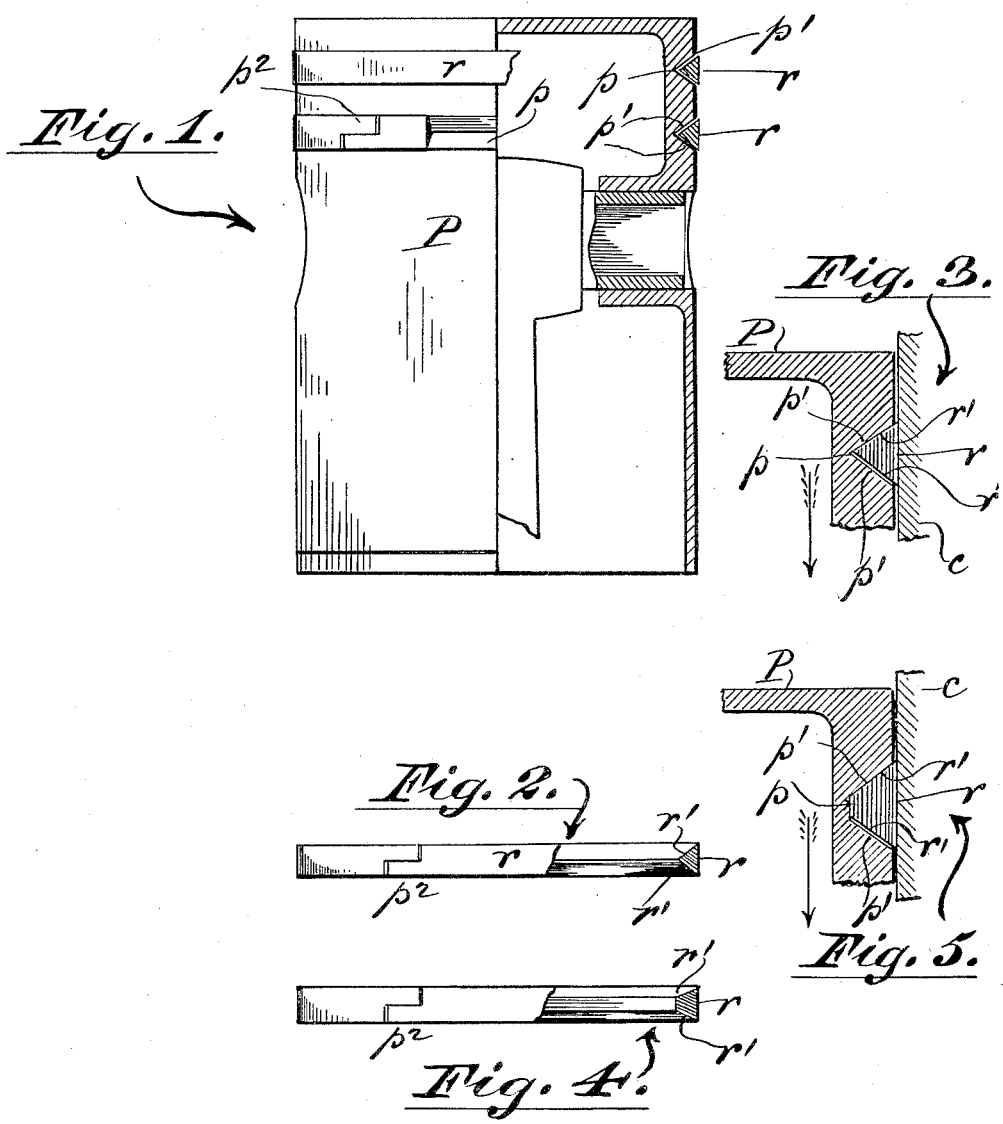
Inventors:
Robert R. Hill, Ralph G. Law,
By their Attorney
Leo. W. Hiatt

UNITED STATES PATENT OFFICE.

ROBERT R. HILL AND RALPH G. LAW, OF MANHASSET, NEW YORK.

PISTON-PACKING.

1,381,993.

Specification of Letters Patent. Patented June 21, 1921.

Application filed November 22, 1919. Serial No. 339,861.

*To all whom it may concern:*

Be it known that we, ROBERT R. HILL and RALPH G. LAW, citizens of the United States, and residents of Manhasset, in the county of Queens and State of New York, have invented certain new and useful Improvements in Piston-Packings, of which the following is a specification.

The essential features of our invention are applicable to reciprocatory pistons generally, and especially to those used in the power cylinders of fluid pressure engines or motors, of either steam or gas type,—our main object being to attain and maintain effectual circumferential contactual engagement with the inner surface of the cylinder with a minimum of frictional resistance; to centralize the piston in the cylinder automatically; to compensate for wear; to promote effectual lubrication, etc.; all as hereinafter more fully set forth,—the essential and distinctive feature of the invention consisting in forming the peripheral piston packing grooves with centrally convergent side walls and the packing rings also with correspondingly centrally convergent sides for contact therewith, whereby the resistance engendered by the motion of the piston in either direction will press the packing rings against the opposed inclined surfaces of the grooves and thus tend constantly to force the rings outward concentrically against the cylinder in accordance with the well known principle of inclined plane action. In other words, we do not rely alone as heretofore upon the inherent elasticity and resilience of the packing rings themselves for effectual contactual engagement with the inner surface of the cylinder, but supplement the same by an action analogous to that of wedging, in that the forceful contacting of two opposed annular inclined planes is utilized to press the rings outward circumferentially against the concave surface of the cylinder.

In the accompanying drawings,

Figure 1, is a sectional elevation of a piston equipped with packing means embodying the essential features of our invention;

Fig. 2, is a sectional elevation of one of the packing rings shown in Fig. 1;

Fig. 3, is a sectional detail view, on a larger scale, illustrating the function of our new form of piston packing;

Fig. 4, is a view similar to Fig. 2, showing a modification;

Fig. 5, is a view similar to Fig. 3, of the modification shown in Fig. 4.

The gist of our invention consists in forming the packing grooves $p$, of a piston P, with inwardly and centrally convergent side walls $p'$, $p'$, and in forming the packing rings $r$, likewise with inwardly convergent inclined sides $r'$, $r'$, for contactual engagement with the aforesaid inclined side walls $p'$, $p'$, of the grooves $p$. Thus, in Figs. 1, 2 and 3, the packing rings $r$, $r$, are triangular in cross section, while the peripheral grooves $p$, formed for their placement on the piston are V-shaped; whereas in Figs. 4 and 5, the ring in cross section is shown as of truncated wedge shape, and the groove $p$, has a floor corresponding to the truncated portion of the ring. In either case the result is essentially the same, as will be understood by reference more particularly to Figs. 3 and 5, in that the inclined planes $r'$, of the rings $r$, are adapted to contact directly with the inclined planes $p'$, of the grooves.

The rings are, of course, as heretofore, split, as at $p^2$, in any well known or desired manner, to admit of expansion and contraction circumferentially; and they are intended to equal approximately in cross section the cross area of the grooves when contracted therein, as when the piston is at rest, yet leaving a slight space between one plane of the ring and the adjacent plane of the groove as seen in Figs. 3 and 5 to allow of the shift of the ring in the direction of the movement of the piston, one way or the other, to throw the acting face of the ring beyond the peripheral face of the piston, as seen in Figs. 3 and 5.

When the piston moves in either direction however the frictional contact of the pehipheral surface of a ring $r$, with the concave surface of the cylinder $(c)$ will cause one inclined plane $r'$, of the ring $r$, to bear against the opposed plane or inclined surface $p'$, of the piston groove $p$, with the result that the ring will be forced "up hill" and tend to expand circumferentially, thereby insuring a close and effective packing between piston and cylinder, and counteracting any tendency of the packing ring to wabble or play loosely within its piston groove.

By the same means, and for a like reason, the piston is thus automatically centralized with accuracy with relation to the axial center of the cylinder, thereby insuring even, uniform motion, avoiding excess of frictional resistance, and obviating loss of power,—the wear being confined by our invention mainly to the packing ring itself and this being compensated for (until the ring is greatly reduced in cross section) by the aforesaid contactual engagement between the opposed inclined surfaces or planes.

Another and incidental advantage of our method of piston packing is that it facilitates lubrication, because the advancing edge of the packing ring scrapes the lubricant into the piston groove to be re-distributed during the stroke of the piston in the opposite direction.

It is to be understood that by the term "metallic" as applied herein to our packing rings, we mean to designate any rigid, solid, practically non-compressible metal or metallic alloy suitable for the purpose, and affording the requisite degree of circumferential elasticity and resilience to enable the ring to adapt itself to inclined plane pressure as hereinbefore set forth.

What we claim as our invention and desire to secure by Letters Patent is,

1. A piston formed with a packing groove with inwardly-convergent walls, and a packing ring with inwardly-convergent sides for contactual engagement with the walls of the groove, the convergent walls of the piston and ring being parallel throughout, the said ring being loosely received in said groove and free to shift in the direction of movement of the piston.

2. A piston formed with a packing groove with inwardly-convergent walls, and a packing ring with inwardly-convergent sides for contactual engagement with the walls of the grooves, the convergent walls of the piston and ring being parallel throughout, the said ring being loosely received in said groove and free to shift in the direction of movement of the piston, with flat acting face at all times extended beyond the peripheral face of the piston.

3. A piston formed with a packing groove with inwardly-convergent walls, and a split metallic packing ring with inwardly-convergent sides for contactual engagement with the walls of the groove, the convergent walls of the piston and ring being parallel throughout, the said ring being loosely received in said groove and free to shift in the direction of movement of the piston with flat acting face at all times extended beyond the peripheral face of the piston to contact with the wall of the cylinder and scrape the lubricant into the groove of the piston.

4. A piston formed with a packing groove with inwardly-convergent walls, and a packing ring with inwardly-convergent sides for contactual engagement with said walls with a space between one face of the ring and the adjacent face of the groove to allow of automatic shifting of the ring in the direction of the movement of the piston in either direction to throw the acting face of the ring beyond the peripheral face of the piston, the convergent walls of the piston and ring being parallel throughout.

ROBERT R. HILL.
RALPH G. LAW.

Witnesses:
 GEO. WM. MIATT,
 DOROTHY MIATT.